United States Patent
Matsuoka

(10) Patent No.: US 10,030,884 B2
(45) Date of Patent: Jul. 24, 2018

(54) AUTO-CONFIGURING TIME-OF-DAY FOR BUILDING CONTROL UNIT

(71) Applicant: Google LLC, Mountain View, CA (US)

(72) Inventor: Yoky Matsuoka, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 15/214,582

(22) Filed: Jul. 20, 2016

(65) Prior Publication Data

US 2016/0341437 A1  Nov. 24, 2016

Related U.S. Application Data

(63) Continuation of application No. 13/994,444, filed as application No. PCT/US2012/020088 on Jan. 3, (Continued)

(51) Int. Cl.
*F24F 11/62* (2018.01)
*G05D 23/19* (2006.01)
(Continued)

(52) U.S. Cl.
CPC ............ *F24F 11/62* (2018.01); *F24F 11/006* (2013.01); *F24F 11/0009* (2013.01);
(Continued)

(58) Field of Classification Search
CPC ............ G05D 23/1919; G05D 23/1917; F24F 11/0086; F24F 2011/0064; F24F 2221/32; F24F 2011/0091; F24F 2011/0049
See application file for complete search history.

(56) References Cited

U.S. PATENT DOCUMENTS

| 4,223,831 A | 9/1980 | Szarka |
| 4,335,847 A | 6/1982 | Levine |

(Continued)

FOREIGN PATENT DOCUMENTS

| CA | 2202008 C | 2/2000 |
| EP | 196069 B1 | 12/1991 |

(Continued)

OTHER PUBLICATIONS

International Patent Application No. PCT/US2012/020088, International Search Report & Written Opinion, dated May 1, 2012; 11 pages.

(Continued)

*Primary Examiner* — Christopher E Everett
(74) *Attorney, Agent, or Firm* — Kilpatrick Townsend & Stockton LLP

(57) ABSTRACT

Provided according to some embodiments is a thermostat is capable of discerning the time-of-day without external input. Should the user fail to set the time, the thermostat uses one or more sensors to determine the time-of-day through a variety of techniques. In one example, a light sensor can monitor natural light to understand the cycle of sun with respect to the installation location. From the cycle of natural light a latitude, time-of-year, time-of-day, etc. can be estimated through processing sensor information over time. Should the thermostat have its time manually set or gathered from the network, it would override the estimated time-of-day. Techniques can be used to filter input from the one or more sensors to avoid confusion from other inputs, for example, man-made lighting.

20 Claims, 8 Drawing Sheets

Related U.S. Application Data 2012, now Pat. No. 9,426,692, which is a continuation-in-part of application No. PCT/US2011/061437, filed on Nov. 18, 2011.

(60) Provisional application No. 61/627,996, filed on Oct. 21, 2011, provisional application No. 61/429,093, filed on Dec. 31, 2010, provisional application No. 61/415,771, filed on Nov. 19, 2010.

(51) Int. Cl.

| | | |
|---|---|---|
| *F24F 11/30* | (2018.01) | |
| *F24F 11/00* | (2018.01) | |
| *G05B 15/02* | (2006.01) | |
| *G06F 17/14* | (2006.01) | |
| *F24F 11/63* | (2018.01) | |
| *F24F 11/52* | (2018.01) | |
| *F24F 130/20* | (2018.01) | |

(52) U.S. Cl.
CPC .......... *F24F 11/0086* (2013.01); *F24F 11/30* (2018.01); *G05B 15/02* (2013.01); *G05D 23/19* (2013.01); *G05D 23/1902* (2013.01); *G06F 17/142* (2013.01); *F24F 11/52* (2018.01); *F24F 11/63* (2018.01); *F24F 2011/0049* (2013.01); *F24F 2011/0061* (2013.01); *F24F 2011/0091* (2013.01); *F24F 2130/20* (2018.01); *G05D 23/1928* (2013.01)

(56) References Cited

U.S. PATENT DOCUMENTS

| | | | |
|---|---|---|---|
| 4,408,711 | A | 10/1983 | Levine |
| 4,615,380 | A | 10/1986 | Beckey |
| 4,674,027 | A | 6/1987 | Beckey |
| 4,685,614 | A | 8/1987 | Levine |
| 4,751,961 | A | 6/1988 | Levine et al. |
| 4,897,798 | A | 1/1990 | Cler |
| 5,088,645 | A | 2/1992 | Bell |
| 5,211,332 | A | 5/1993 | Adams |
| 5,240,178 | A | 8/1993 | Dewolf et al. |
| 5,244,146 | A | 9/1993 | Jefferson et al. |
| 5,395,042 | A | 3/1995 | Riley et al. |
| 5,476,221 | A | 12/1995 | Seymour |
| 5,499,196 | A | 3/1996 | Pacheco |
| 5,555,927 | A | 9/1996 | Shah |
| 5,611,484 | A | 3/1997 | Uhrich |
| 5,808,294 | A | 9/1998 | Neumann |
| 5,902,183 | A | 5/1999 | D'Souza |
| 5,909,378 | A | 6/1999 | De Milleville |
| 5,977,964 | A | 11/1999 | Williams et al. |
| 6,062,482 | A | 5/2000 | Gauthier et al. |
| 6,066,843 | A | 5/2000 | Scheremeta |
| 6,095,427 | A | 8/2000 | Hoium et al. |
| 6,098,893 | A | 8/2000 | Berglund et al. |
| 6,216,956 | B1 | 4/2001 | Ehlers et al. |
| 6,349,883 | B1 | 2/2002 | Simmons et al. |
| 6,356,204 | B1 | 3/2002 | Guindi et al. |
| 6,478,233 | B1 | 11/2002 | Shah |
| 6,645,066 | B2 | 11/2003 | Gutta et al. |
| 6,769,482 | B2 | 8/2004 | Wagner et al. |
| 6,990,821 | B2 | 1/2006 | Singh et al. |
| 7,024,336 | B2 | 4/2006 | Salsbury et al. |
| 7,188,482 | B2 | 3/2007 | Sadegh et al. |
| 7,379,791 | B2 | 5/2008 | Tamarkin et al. |
| RE40,437 | E | 7/2008 | Rosen |
| 7,469,550 | B2 | 12/2008 | Chapman, Jr. et al. |
| 7,644,869 | B2 | 1/2010 | Hoglund et al. |
| 7,702,424 | B2 | 4/2010 | Cannon et al. |
| 7,784,704 | B2 | 8/2010 | Harter |
| 7,802,618 | B2 | 9/2010 | Simon et al. |
| 7,848,900 | B2 | 12/2010 | Steinberg et al. |
| 7,854,389 | B2 | 12/2010 | Ahmed |
| 8,010,237 | B2 | 8/2011 | Cheung et al. |
| 8,019,567 | B2 | 9/2011 | Steinberg et al. |
| 8,090,477 | B1 | 1/2012 | Steinberg |
| 8,131,497 | B2 | 3/2012 | Steinberg et al. |
| 8,180,492 | B2 | 5/2012 | Steinberg |
| 8,219,249 | B2 | 7/2012 | Harrod et al. |
| 9,429,962 | B2 | 8/2016 | Matsuoka |
| 2004/0249479 | A1 | 12/2004 | Shorrock |
| 2005/0128067 | A1 | 6/2005 | Zakrewski |
| 2005/0189429 | A1 | 9/2005 | Breeden |
| 2005/0192915 | A1 | 9/2005 | Ahmed et al. |
| 2005/0280421 | A1 | 12/2005 | Yomoda et al. |
| 2006/0186214 | A1 | 8/2006 | Simon et al. |
| 2006/0196953 | A1 | 9/2006 | Simon et al. |
| 2007/0115902 | A1 | 5/2007 | Shamoon et al. |
| 2008/0015740 | A1 | 1/2008 | Osann |
| 2008/0015742 | A1 | 1/2008 | Kulyk et al. |
| 2008/0191045 | A1 | 8/2008 | Harter |
| 2008/0273754 | A1 | 11/2008 | Hick et al. |
| 2008/0317292 | A1 | 12/2008 | Baker et al. |
| 2009/0171862 | A1 | 7/2009 | Harrod et al. |
| 2009/0254222 | A1 | 10/2009 | Berman et al. |
| 2009/0254225 | A1 | 10/2009 | Boucher et al. |
| 2009/0259713 | A1 | 10/2009 | Blumrich et al. |
| 2009/0297901 | A1 | 12/2009 | Kilian et al. |
| 2010/0019051 | A1 | 1/2010 | Rosen |
| 2010/0025483 | A1 | 2/2010 | Hoeynck et al. |
| 2010/0070084 | A1 | 3/2010 | Steinberg et al. |
| 2010/0070086 | A1 | 3/2010 | Harrod et al. |
| 2010/0070234 | A1 | 3/2010 | Steinberg et al. |
| 2010/0084482 | A1 | 4/2010 | Kennedy et al. |
| 2010/0167783 | A1 | 7/2010 | Alameh et al. |
| 2010/0211224 | A1 | 8/2010 | Keeling et al. |
| 2010/0262298 | A1 | 10/2010 | Johnson et al. |
| 2010/0262299 | A1 | 10/2010 | Cheung et al. |
| 2010/0280667 | A1 | 11/2010 | Steinberg |
| 2010/0289643 | A1 | 11/2010 | Trundle et al. |
| 2010/0308119 | A1 | 12/2010 | Steinberg et al. |
| 2010/0318227 | A1 | 12/2010 | Steinberg et al. |
| 2011/0046792 | A1 | 2/2011 | Imes et al. |
| 2011/0046805 | A1 | 2/2011 | Bedros et al. |
| 2011/0046806 | A1 | 2/2011 | Nagel et al. |
| 2011/0077896 | A1 | 3/2011 | Steinberg et al. |
| 2011/0185895 | A1 | 8/2011 | Freen |
| 2011/0307103 | A1 | 12/2011 | Cheung et al. |
| 2012/0065935 | A1 | 3/2012 | Steinberg et al. |
| 2012/0085831 | A1 | 4/2012 | Kopp |
| 2012/0158350 | A1 | 6/2012 | Steinberg et al. |
| 2012/0221151 | A1 | 8/2012 | Steinberg |

FOREIGN PATENT DOCUMENTS

| | | |
|---|---|---|
| JP | 59106311 A | 6/1984 |
| JP | 01252850 A | 10/1989 |
| WO | 2012/092627 A1 | 7/2012 |

OTHER PUBLICATIONS

Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.

(56) References Cited

OTHER PUBLICATIONS

Honeywell THX9321 Prestige 2.0 and TXH9421 Prestige IAQ 2.0 with EIM Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Allen et al., Real-Time Earthquake Detection and Hazard Assessment by ElarmS Across California, Geophysical Research Letters, vol. 36, L00B08, 2009, pp. 1-6.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming TheArmostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
International Preliminary Report on Patentability dated Jul. 2, 2013 for International Patent Application No. PCT/US2012/020088 filed Jan. 3, 2012, all pages.

AUTO-CONFIGURING TIME-OF-DAY FOR BUILDING CONTROL UNIT

This application is a Continuation of U.S. Ser. No. 13/994,444 filed on Sep. 25, 2013, which is a U.S. National Phase entry under 35 U.S.C. § 371 and claims the benefit of International Application No. PCT/US2012/20088 filed on Jan. 3, 2012, which is a continuation-in-part of PCT/US11/61437 filed Nov. 18, 2011, which claimed the benefit of: U.S. Prov. Ser. No. 61/415,771 filed on Nov. 19, 2010; U.S. Prov. Ser. No. 61/429,093 filed on Dec. 31, 2010; and U.S. Prov. Ser. No. 61/627,996 filed on Oct. 21, 2011.

Each of the above-listed applications is hereby incorporated by reference in their entireties.

FIELD

This patent specification relates to systems, methods, and related computer program products for the monitoring and control of energy-consuming systems or other resource-consuming systems. More particularly, this patent specification relates to configuring time-of-day for control units that govern the operation of energy-consuming systems, property control systems, household devices, or other resource-consuming systems, including thermostats that govern the operation of heating, ventilation, and air conditioning (HVAC) systems.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in 5 energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Some thermostats offer programming abilities that provide the potential for balancing user comfort and energy savings. However, users are frequently intimidated by a dizzying array of switches and controls. Thus, the thermostat may frequently resort to default programs, thereby reducing user satisfaction and/or energy-saving opportunities. One such configuration difficulty is setting the time-of-day. This is complicated by different time zones and daylight savings time and changes thereto. Controlling HVAC equipment is often time-of-day based. When the time-of-day is not set, elegant control of the HVAC equipment is hampered.

SUMMARY

In one embodiment, a thermostat is capable of discerning the time-of-day without external input. Should the user fail to set the time, the thermostat uses one or more sensors to determine the time-of-day through a variety of techniques. In one example, a light sensor can monitor natural light to understand the cycle of sun with respect to the installation location. From the cycle of natural light a latitude, time-of-year, time-of-day, etc. can be estimated through processing sensor information over time. Should the thermostat have its time manually set or gathered from the network, it would override the estimated time-of-day. Techniques can be used to filter input from the one or more sensors to avoid confusion from other inputs, for example, man-made lighting.

In another embodiment, a thermostat is comprised of a power source, a housing, a clock function for tracking time-of-day, a sensor configured to read environmental conditions that vary with time-of-day, a processor, and a number of heating, ventilation, and air conditioning (HVAC) wire connectors, and an electronic display configured to display information to a user. The processor is configured to: receive input from the sensor; estimate time-of-day using the sensor, and program the clock function using the estimated time-of-day. The HVAC wire connectors are coupled to the processing system and configured control an HVAC system as a function of the estimated time-of-day.

In yet another embodiment, a method for operating a thermostat is disclosed. Sensor readings of environmental conditions are loaded. The sensor readings of environmental conditions are processed using the thermostat. The environmental conditions correlate with time-of-day. Time-of-day is estimated from the environmental conditions. The estimated time-of-day is tracked within the thermostat. Heating, ventilation, and air conditioning (HVAC) wire connectors coupled to the thermostat are controlled. The HVAC wired connectors are configured to control an HVAC system as a function of the estimated time-of-day.

In still another embodiment, a device for governing and/or facilitating the governance of a resource consuming system is disclosed. The device includes a power input, a housing, a clock function for tracking time-of-day; a sensor input configured to receive environmental conditions that vary with time-of-day, a learning function, and at least one output. The learning function is configured to: estimate time-of-day using the sensor input readings of the environmental conditions, and program the clock function using the estimated time-of-day. The at least one output provides at least one output signal that is used in governance of the resource-consuming system. The at least one output signal is at least in part a function of the estimated time-of-day.

DETAILED DESCRIPTION OF THE INVENTION

Figure 1A:
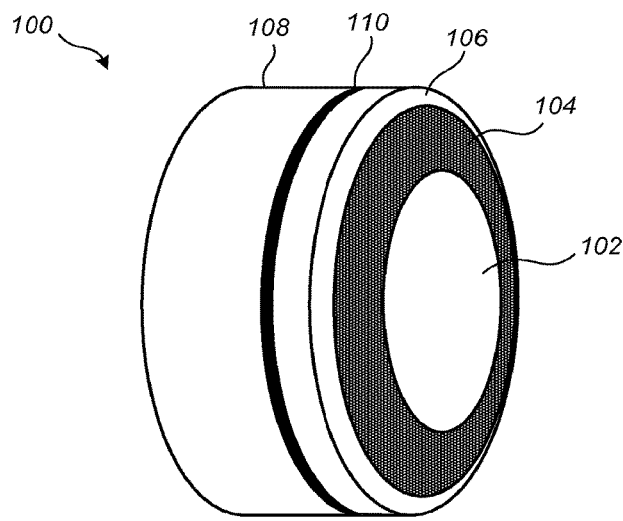
FIG. 1A illustrates a perspective view of a versatile sensing and control unit (VSCU) according to an embodiment.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; and PCT/US11/61503 filed Nov. 18, 2011. The above-referenced patent applications are collectively referenced herein as "the commonly assigned incorporated applications."

Provided according to one or more embodiments are systems, methods, computer program products, and related business methods for controlling one or more HVAC systems based on one or more versatile sensing and control units (VSCUs), each VSCU being configured and adapted to provide sophisticated, customized, energy-saving HVAC control functionality while at the same time being visually appealing, non-intimidating, elegant to behold, and delightfully easy to use. Each VSCU includes a variety of control functions tied to time-of-day. Where time-of-day is not user configured or determined from a connected network, the VSCU estimates time-of-day based upon one or more sensor inputs.

Nevertheless, each VSCU may be advantageously provided with a selectively layered functionality, such that unsophisticated users are only exposed to a simple user interface, but such that advanced users can access and manipulate many different energy-saving and energy tracking capabilities. For example, an advanced user may be able to set a plurality of time-dependent temperature set points and a variety of other preferences through interactions by a rotatable and inward-clickable outer ring with a judiciously layered graphical user interface, while an unsophisticated user may limit their interactions to a simple turning of the outer ring to set a desired temperature. Importantly, even for the case of unsophisticated users who are only exposed to the simple user interface, the VSCU provides advanced energy-saving functionality that runs in the background, the VSCU quietly using multi-sensor technology to "learn" about the home's heating and cooling environment and optimizing the energy-saving settings accordingly.

The VSCU also "learns" about the users themselves through user interactions with the device (e.g., via the rotatable ring) and/or through automatic learning of the users' preferences. For example, in a congenial "setup interview", a user may respond to a few simple questions (e.g., zip code of the installation, time-of-day, day-of-year). Multi-sensor technology may later be employed to detect user occupancy patterns (e.g., what times of day they are home and away), and a user's control over set temperature on the dial may be tracked over time. The multi-sensor technology is advantageously hidden away inside the VSCU itself, thus avoiding the hassle, complexity, and intimidation factors associated with multiple external sensor-node units. On an ongoing basis, the VSCU processes the learned and sensed information according to one or more advanced control algorithms, and then automatically adjusts its environmental control settings to optimize energy usage while at the same time maintaining the living space at optimal levels according to the learned occupancy patterns and comfort preferences of the user. Even further, the VSCU is programmed to promote energy-saving behavior in the users themselves by virtue of displaying, at judiciously selected times on its visually appealing user interface, information that encourages reduced energy usage, such as historical energy cost performance, utilization of off-peak energy pricing from the utility, forecasted energy costs, and even fun game-style displays of congratulations and encouragement.

Advantageously, the selectively layered functionality of the VSCU allows it to be effective for a variety of different technological circumstances in home and business environments, thereby making the same VSCU readily saleable to a wide variety of customers. For simple environments having no wireless home network or internet connectivity, the VSCU operates effectively in a standalone mode, being capable of learning and adapting to its environment based on multi-sensor technology and user input, and optimizing HVAC settings accordingly. However, for environments that do indeed have home network or internet connectivity, the VSCU can operate effectively in a network-connected mode to offer a rich variety of additional capabilities.

It is to be appreciated that while one or more embodiments is detailed herein for the context of a residential home, such as a single-family house, the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more HVAC systems. It is to be further appreciated that while the terms user, customer, installer, homeowner, occupant, guest, tenant, landlord, repair person, and the like may be used to refer to the person or persons who are interacting with the VSCU or other device or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit and is a customer of the utility company and/or VSCU data service provider. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected temperature governance functionality described further herein may be particularly advantageous where the landlord holds the sole password and can prevent energy waste by the tenant—such identity should not be construed in the descriptions that follow as necessarily limiting the scope of the present teachings to those particular individuals having those particular identities.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

Various embodiments herein discuss the VSCU in the context of an HVAC application. The VSCU could be used in other embodiments to control any building or property function. For example, the VSCU could be used to control garden sprinklers, swimming pool functions, solar energy control, lighting systems, holiday lights, or any other application that controls something over time periods. The interface for the VSCU can have various profiles for different uses.

As used herein, "set point" or "temperature set point" refers to a target temperature setting of a temperature control system, such as one or more of the VSCUs described herein, as set by a user or automatically according to a schedule. As would be readily appreciated by a person skilled in the art, many of the disclosed thermostatic functionalities described hereinbelow apply, in counterpart application, to both the heating and cooling contexts, with the only different being in the particular set points and directions of temperature movement. To avoid unnecessary repetition, some examples of the embodiments may be presented herein in only one of these contexts, without mentioning the other. Therefore, where a particular embodiment or example is set forth hereinbelow in the context of home heating, the scope of the present teachings is likewise applicable to the counterpart context of home cooling, and vice versa, to the extent such counterpart application would be logically consistent with the disclosed principles as adjudged by the skilled artisan.

For one embodiment that is particularly advantageous in the context of non-network-connected VSCUs, the VSCU is configured and programmed to use optically sensed information to determine an approximate time-of-day. For a large majority of installations, regardless of the particular location of installation in the home (the only exceptions being perhaps film photography development labs or other purposely darkened rooms), there will generally be a cyclical 24-hour pattern in terms of the amount of ambient light that is around the VSCU. This cyclical 24-hour pattern is automatically sensed, with spurious optical activity such as light fixture actuations being filtered out over many days or weeks if necessary, and optionally using ZIP code information, to establish a rough estimate of the actual time-of-day. This rough internal clock can be used advantageously for non-network-connected installations to verify and correct a gross clock setting error by the user (such as, but not limited to, reversing AM and PM), or as a basis for asking the user to double-check (using the circular display monitor 102), or to establish a time-of-day clock if the user did not enter a time. Notably, while the described methods are particularly advantageous for (i) versions of the VSCU that are not network-capable, and/or (ii) network-capable VSCU versions that are installed in homes or other environments not having Internet ("cloud") connectivity, it is to be appreciated that the scope of the described embodiments is not so limited. Even for network-connected VSCU units, it may still be advantageous to have the capability to estimate the time-of-day by virtue of ambient light sensor readings (or readings from other sensors), such as for providing a "sanity check" on the time-of-day provided over the Internet from a cloud server. In a simplest scenario, there may be an error in the time zone that is unknown or unknowable to the cloud server because the geographical location is in error, either due to user mistake at setup time or some other error, which could be detected by using the methods of the present invention and brought to the user's attention, brought to the cloud server's attention, or invoke some other corrective action.

FIG. 1A illustrates a perspective view of a versatile sensing and control unit (VSCU) 100 according to an embodiment. Unlike so many prior art thermostats, the VSCU 100 in this embodiment has a sleek, elegant appearance that does not detract from home decoration, and indeed can serve as a visually pleasing centerpiece for the immediate location in which it is installed. The VSCU 100 comprises a main body 108 that is circular with a diameter of about 8 cm, and that has a visually pleasing outer finish, such as a satin nickel or chrome finish. Separated from the main body 108 by a small peripheral gap 110 is a cap-like structure comprising a rotatable outer ring 106, a sensor ring 104, and a circular display monitor 102. The circular display monitor may or may not comprise a touch screen, which allows for a user to directly interact with the monitor. For example, in one instance, an outer ring is itself a touch screen or touch sensitive (such that it may be virtually rotated by a user's finger movement) and a display within the ring either does or does not include touch-detection capabilities. In one instance, an outer ring may be physically rotated and a display within the ring is a touch screen (e.g., such that a user may select a type of setting using the touch-screen display and select a particular value for the setting using the outer ring). The outer ring 106 has an outer finish identical to that of the main body 108, while the sensor ring 104 and circular display monitor 102 have a common circular glass (or plastic) outer covering that is gently arced in an outward direction and that provides a sleek yet solid and durable-looking overall appearance. The sensor ring 104 contains any of a wide variety of sensors including, without limitation, infrared sensors, visible-light sensors, and/or acoustic sensors. Preferably, the glass (or plastic) that covers the sensor ring 104 is smoked or mirrored such that the sensors themselves are not visible to the user. For some embodiments, a metallic grill member (not shown in FIGS. 1A-1C) is integrated at one or more locations around the sensor ring, behind which a temperature sensor is located, such that the temperature sensor has thermal access to the ambient air. For some embodiments, the need for a grill member may be obviated by virtue of an air venting functionality provided by virtue of the peripheral gap 110, for example.

Figure 1B:
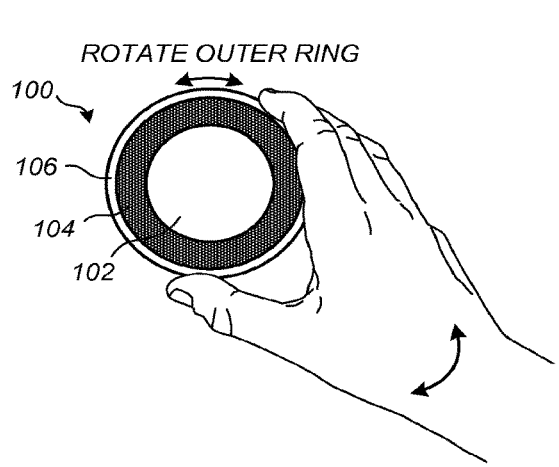
FIGS. 1B-1C illustrate the VSCU as it is being controlled by the hand of a user according to an embodiment.
Figure 1C:
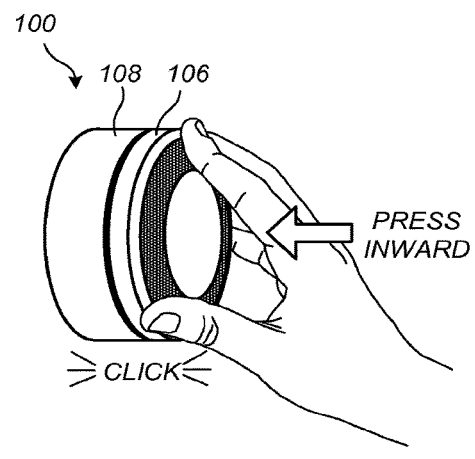

FIGS. 1B-1C illustrate the VSCU 100 as it is being controlled by the hand of a user according to an embodiment. In one embodiment, for the combined purposes of inspiring user confidence and further promoting visual and functional elegance, the VSCU 100 is controlled by only two types of user input, the first being a rotation of the outer ring 106 (FIG. 1B), and the second being an inward push on the outer ring 106 (FIG. 1C) until an audible and/or tactile "click" occurs. For one embodiment, the inward push of FIG. 1C only causes the outer ring 106 to move forward, while in another embodiment the entire cap-like structure, including both the outer ring 106 and the glass covering of the sensor ring 104 and circular display monitor 102, move inwardly together when pushed. Preferably, the sensor ring 104, the circular display monitor 102, and their common glass covering do not rotate with outer ring 106.

By virtue of user rotation of the outer ring 106 (referenced hereafter as a "ring rotation") and the inward pushing of the outer ring 106 (referenced hereinafter as an "inward click") responsive to intuitive and easy-to-read prompts on the circular display monitor 102, the VSCU 100 is advantageously capable of receiving all necessary information from the user for basic setup and operation. Preferably, the outer ring 106 is mechanically mounted in a manner that provides a smooth yet viscous feel to the user, for further promoting an overall feeling of elegance while also reducing spurious or unwanted rotational inputs. According to various implementations, the outer ring 106 rotates on plastic bearings and uses an optical digital encoder to measure the rotational movement and/or rotational position of the outer ring 106. In accordance with alternate implementations, other technologies such as mounting the outer ring 106 on a central shaft may be employed. For one embodiment, the VSCU 100 recognizes three fundamental user inputs by virtue of the ring rotation and inward click: (1) ring rotate left, (2) ring rotate right, and (3) inward click.

According to some implementations, multiple types of user input may be generated depending on the way a pushing inward of head unit front including the outer ring 106 is effectuated. In some implementations a single brief push inward of the outer ring 106 until the audible and/or tactile click occurs followed by a release (single click) can be interpreted as one type of user input (also referred to as an "inward click"). In other implementations, pushing the outer ring 106 in and holding with an the inward pressure for an amount of time such as 1-3 seconds can be interpreted as another type of user input (also referred to as a "press and hold"). According to some further implementations, other types of user input can be effectuated by a user such as double and/or multiple clicks, and pressing and holding for longer and/or shorter periods of time. According to other implementations, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

The VSCU 100 comprises physical hardware and firmware configurations, along with hardware, firmware, and software programming that is capable of carrying out the functionalities described explicitly herein or in one of the commonly assigned incorporated applications. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms. Similar comments apply to described devices and functionalities extrinsic to the VSCU 100, such as devices and programs used in remote data storage and data processing centers that receive data communications from and/or that provide data communications to the VSCU 100. By way of example, references hereinbelow to machine learning and mathematical optimization algorithms, as carried out respectively by the VSCU 100 in relation to home occupancy prediction and set point optimization, for example, can be carried out using one or more known technologies, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

Figure 2:
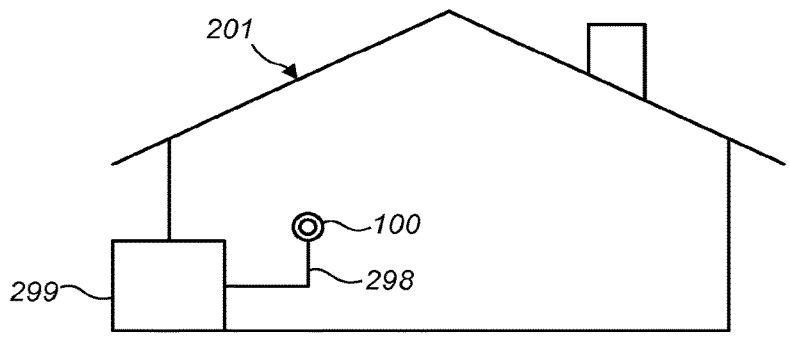
FIG. 2 illustrates the VSCU as installed in a house having an HVAC system and a set of control wires extending therefrom.

FIG. 2 illustrates the VSCU 100 as installed in a house 201 having an HVAC system 299 and a set of control wires 298 extending therefrom. The VSCU 100 is, of course, extremely well suited for installation by contractors in new home construction and/or in the context of complete HVAC system replacement. However, one alternative key business opportunity leveraged according to one embodiment is the marketing and retailing of the VSCU 100 as a replacement thermostat in an existing homes, wherein the customer (and/or an HVAC professional) disconnects their old thermostat from the existing wires 298 and substitutes in the VSCU 100.

In either case, the VSCU 100 can advantageously serve as an "inertial wedge" for inserting an entire energy-saving technology platform into the home. Simply stated, because most homeowners understand and accept the need for home to have a thermostat, even the most curmudgeonly and techno-phobic homeowners will readily accept the simple, non-intimidating, and easy-to-use VSCU 100 into their homes. Once in the home, of course, the VSCU 100 will advantageously begin saving energy for a sustainable planet and saving money for the homeowner, including the curmudgeons. Additionally, however, as homeowners "warm up" to the VSCU 100 platform and begin to further appreciate its delightful elegance and seamless operation, they will be more inclined to take advantage of its advanced features, and they will furthermore be more open and willing to embrace a variety of compatible follow-on products and services as are described further hereinbelow. This is an advantageous win-win situation on many fronts in one embodiment, because the planet is benefiting from the propagation of energy-efficient technology, while at the same time the manufacturer of the VSCU and/or their authorized business partners can further expand their business revenues and prospects. For clarity of disclosure, the term "VSCU Efficiency Platform" refers herein to products and services that are technologically compatible with the VSCU 100 and/or with devices and programs that support the operation of the VSCU 100.

Some implementations of the VSCU 100 incorporate one or more sensors to gather data from the environment associated with the house 201. Sensors incorporated in VSCU 100 may detect occupancy, temperature, light, and other environmental conditions and influence the control and operation of HVAC system 299. Additionally, these detectors may be used for multiple purposes, such as temperature control and time-of-day estimation. For one embodiment, the algorithm for estimating the time-of-day can be based exclusively on the readings from an ambient light sensor. One example of a suitable light sensor is the ambient light sensing portion of a Silicon Labs SI1142 Proximity/Ambient Light Sensor. However, although ambient light represents one particularly effective type of environmental characteristic sensed by the VSCU 100 for the purposes of time estimation, the scope of the present teachings is not so limited. For other embodiments, the algorithm to estimate time-of-day and time-of-year can use one or more of a light transducer, a temperature transducer, an infra-red transducer, a video capture array, a sound transducer, and/or a radio frequency transducer in any of a variety of suitable effective combinations. For example, the WiFi and/or Zigbee radios can be used as a sensor to estimate time-of-day by network traffic activity levels that can be sensed from the environment. In another example, heat or cold penetrating the structure when the HVAC system is off or when the effects of the HVAC are compensated for could be measured by a temperature transducer to estimate the heat incident on the structure that correlates to the solar cycle.

VSCU 100 uses a grille member (not shown in FIG. 2) implemented in accordance with the present invention to cover some or all of the sensors in this embodiment. In part, the grille member of the present embodiment adds to the appeal and attraction of the VSCU 100 as the sensors in the VSCU 100 do not protrude, or attract attention from occupants of the house 201 and the VSCU 100 fits with almost any decor. Keeping sensors within the VSCU 100 also reduces the likelihood of damage and loss of calibration during manufacture, delivery, installation or use of the VSCU 100. Yet despite covering these sensors, the specialized design of the grille member facilitates accurately gathering occupancy, temperature and other data from the environment. Further details on this design are also described in detail later herein.

Figure 3:
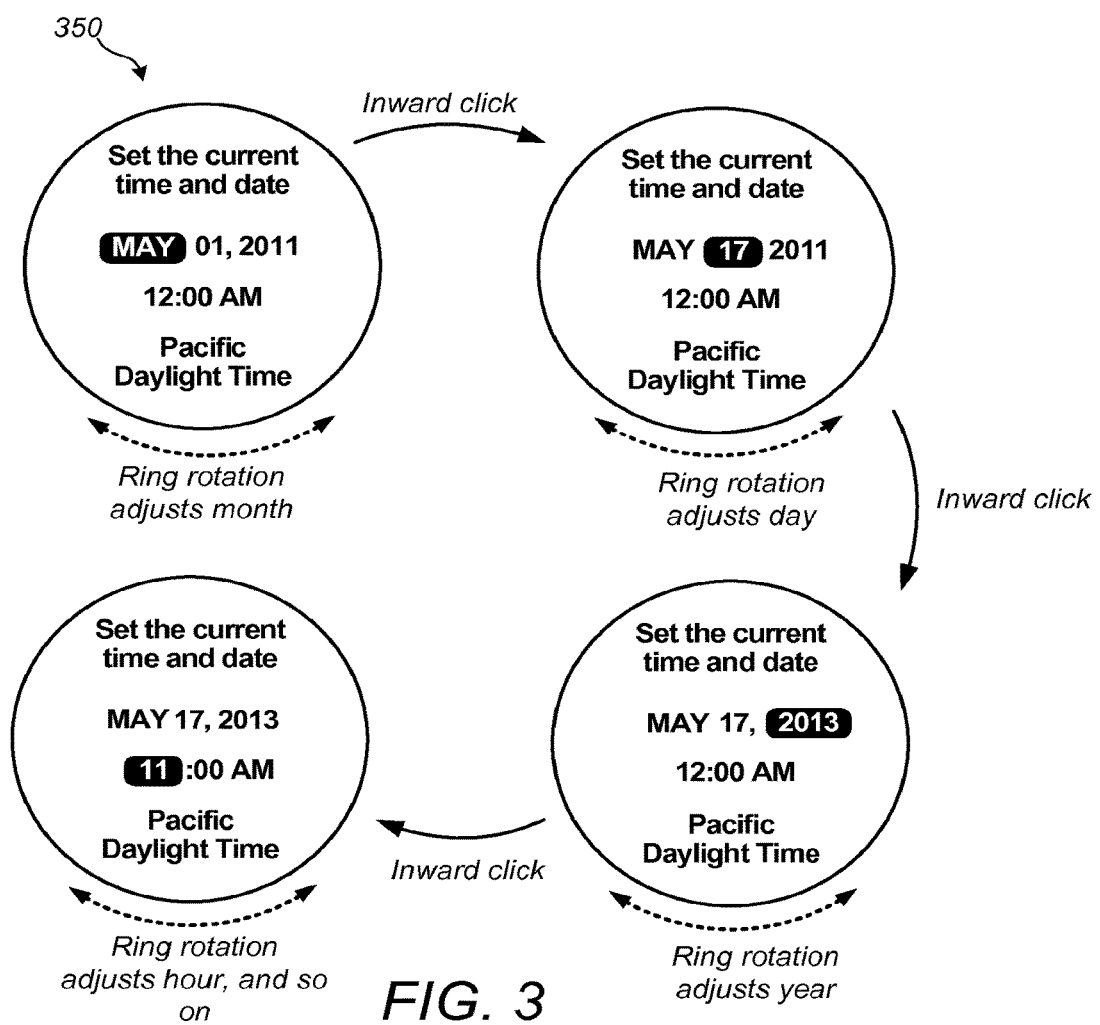
FIG. 3 illustrates user adjustment of time-of-day based on rotations and inward clicks of the outer ring at a time-of-day settings menu of a user interface of a VSCU according to one embodiment.

FIG. 3 illustrates an embodiment in which a user may at least partly change a time-of-day when configuring the VSCU 100, either during an initial installation of the VSCU 100 at which the user interface screen 350 is provided during the interview process, or at any other time by a layered menuing capability that allows the user to access the screen 350. The VSCU 100 can be programmed with a time and date prior to shipment to the customer based upon the shipping address for the order. Additionally, the VSCU 100 will begin autonomously determine the time-of-day and time-of-year from any available sensor information. Once the VSCU 100 is coupled to a network, network time can be gathered from routers, time servers or a server with the shipping details to use the current time and time zone of original shipment to set the time-of-day. Should the sensor information vary appreciably from the time zone of shipment, the VSCU 100 will make a reasonable guess on the time zone that the VSCU 100 may not be in. For example, if the VSCU 100 was shipped to Denver in the Mountain time zone, a presumption may be made that the Pacific or Central time zones are alternatives if the VSCU is gathering an appreciable difference from an initial presumption of installation in the Mountain time zone.

Occasionally, any estimated or network-gathered time-of-day can be used as a starting point when the user is presented with the screen 350. The zip code and/or other geographical or time-related information can be configured in various menus although not shown where the VSCU's estimation, shipping default values, or network gathered information is used initially for modification by the user. A fusion of gathered information and observed sensor data is used by the VSCU when making its autonomous determination on zip code, time zone, daylight savings time, time-of-year, and/or year.

The user is engaging with a configuration screen 350 of the VSCU 100 to optionally set the time-of-day, date, time zone, and/or daylight savings time manually. Rotations of the outer ring 106 cause the currently highlighted time-related characteristics (month, date within month, year, hour, minute, time zone, etc.) to move or toggle among its various possible values. An inward click then confirms that value and moves into the next time-related characteristic, and so on. The outer ring 106 again provides an intuitive mechanism by which the user can interact with the unit to respond to these options.

Figure 4:
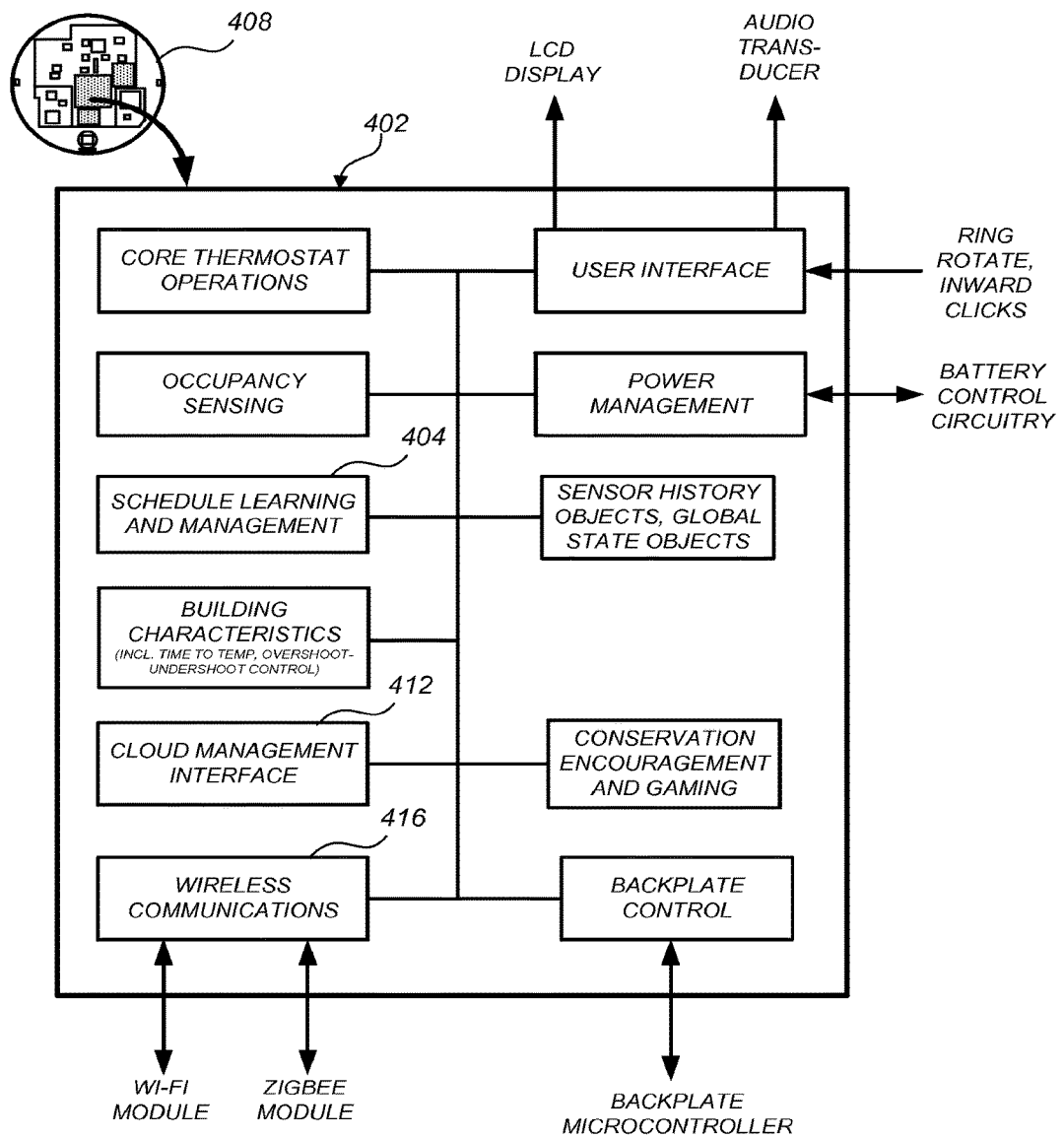
FIG. 4 illustrates an overview of the functional software, firmware, and/or programming architecture of the head unit microprocessor, according to one embodiment.

FIG. 4 illustrates an overview of the functional software, firmware, and/or programming architecture of the head unit microprocessor 402 for achieving its described functionalities. The head unit microprocessor 402 resides on a head unit circuit card housed within the main body 108 of the VSCU 100. The VSCU 100 mates with a backplate having its own microprocessor and functionality. A schedule learning and management (SLM) function 404 performs time-of-day and time-of-year estimation, among other things. Network time and date can be gathered from the cloud management interface 412 when there is network connectivity. A wireless communication function 416 is used for network connectivity.

Figure 5:
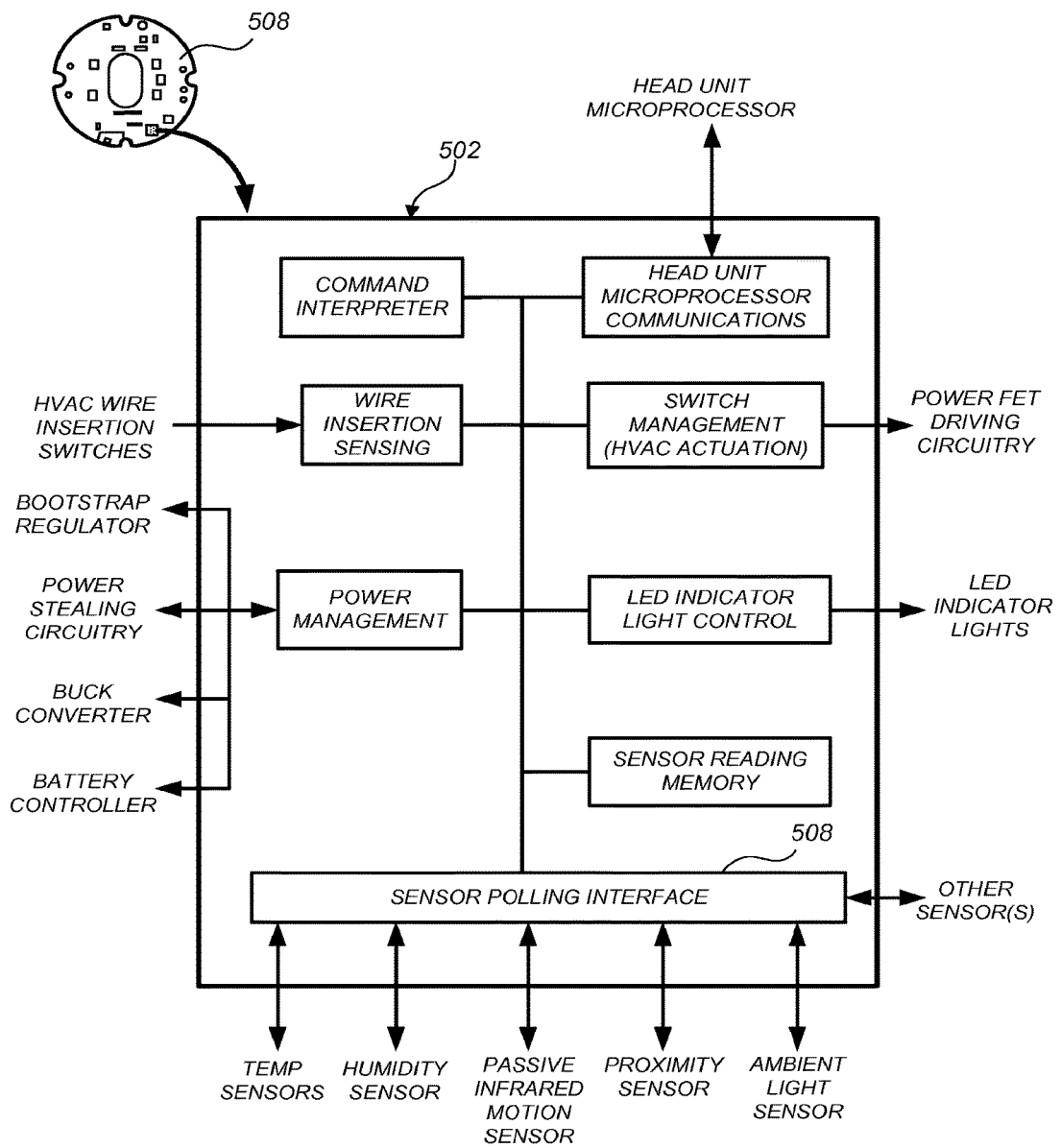
FIG. 5 illustrates an overview of the functional software, firmware, and/or programming architecture of the back plate microcontroller, according to one embodiment.

FIG. 5 illustrates an overview of the functional software, firmware, and/or programming architecture of the back plate microcontroller 502 for achieving its described functionalities. The back plate microcontroller 502 resides on a back plate circuit card 508 that is housed in a back plate body that mates with the main body 108 of the VSCU 100 and communicates via a head unit microprocessor connection. A sensor polling interface 508 connects to a number of sensors. For one embodiment, the various sensors are physically mounted on the head unit circuit board 408 and are electrically coupled to the sensor polling interface of backplate microcontroller 502 by ribbon cables or other electrical connection routes. It is to be appreciated that while the VSCU 100 as set forth in FIGS. 1A-5 represents one particularly useful platform upon which the presently described methods are implemented, it is to be appreciated that the scope of the present teachings is not so limited. More generally, the presently described methods can be implemented on any of a variety of different HVAC or building control devices, components, or subcomponents for any of a variety of different advantageous purposes, provided only that such device has a power source, a processor, and an ambient light sensor and/or other sensor capable of measuring some physical environmental parameter that directly or indirectly exhibits, and/or is characteristic of, some diurnal or circadian behavior. Examples include, but are not limited to: wall-mounted thermostats; desktop or hand-held thermostats; desktop or handheld remote control units that wirelessly control a wall-mounted thermostat; unitary and/or portable heating or air conditioning units having their own internal thermostats; and indoor or outdoor remote sensing units, such as remote temperature or humidity sensing units, that wirelessly report their readings to one or more wall-mounted thermostats. One particularly advantageous use of the presently described time-of-day estimation methods is for achieving at least some degree of coordination among multiple separate control-related devices that may not otherwise be equipped for coordinated control by virtue of mutual two-way communication. By way of example, a home may be outfitted with a wall-mounted thermostat and several remote sensing units, each of the remote sensing units being powered only by a disposable battery. To preserve battery life, each of the remote sensing units may be equipped with only a radio frequency (RF) sending capability and not an RF receiving capability, and therefore the remote sensors are "blind" to each other and to the wall-mounted thermostat. By equipping the wall-mounted thermostat and each remote sensor with an ambient light sensor and a processor programmed with a time-of-day estimation capability according to the present invention, at least some degree of coordination to the otherwise mutually blind remote sensors can be achieved under an assumption that most or all of these remote sensors are "reading" the same time-of-day. It is not difficult to imagine advantageous scenarios that can be enjoyed by virtue of a generally reliable assumption that the many remote sensors and the wall thermostat will be "reading" the same time-of-day. For example, all of the remote units can be programmed at the factory only to send their readings at certain intervals within the hour (e.g., at random instances falling within 1-5 minutes, 16-20 minutes, 31-35 minutes, and 46-50 minutes after the top of the hour), which would allow the wall thermostat to save power and electrical heat by only activating its RF receiving circuitry during those enumerated intervals after the hour. For practical reasons, the wall thermostat could be programmed to listen nonstop for a full hour every so often, to ensure there are no "straggler" sensor units out there. Advantageously, the timewise coordination is achieved without anyone ever having to set a clock for any of the devices. More generally, the ability to have different devices be automatically synchronized to a same time-of-day, without requiring mutual communication and without having to set a time-of-day clock on each device, can be advantageously used in a variety of HVAC and non-HVAC scenarios alike, ranging from lawn sprinkler systems to automated window shade retraction systems to refrigeration systems, with particular applicability when there are multiple units whose behaviors are preferred to be timewise statistically coincident or timewise statistically non-coincident (staggered) with each other in time over representative periods of hours, days, weeks, or months.

Figure 6:
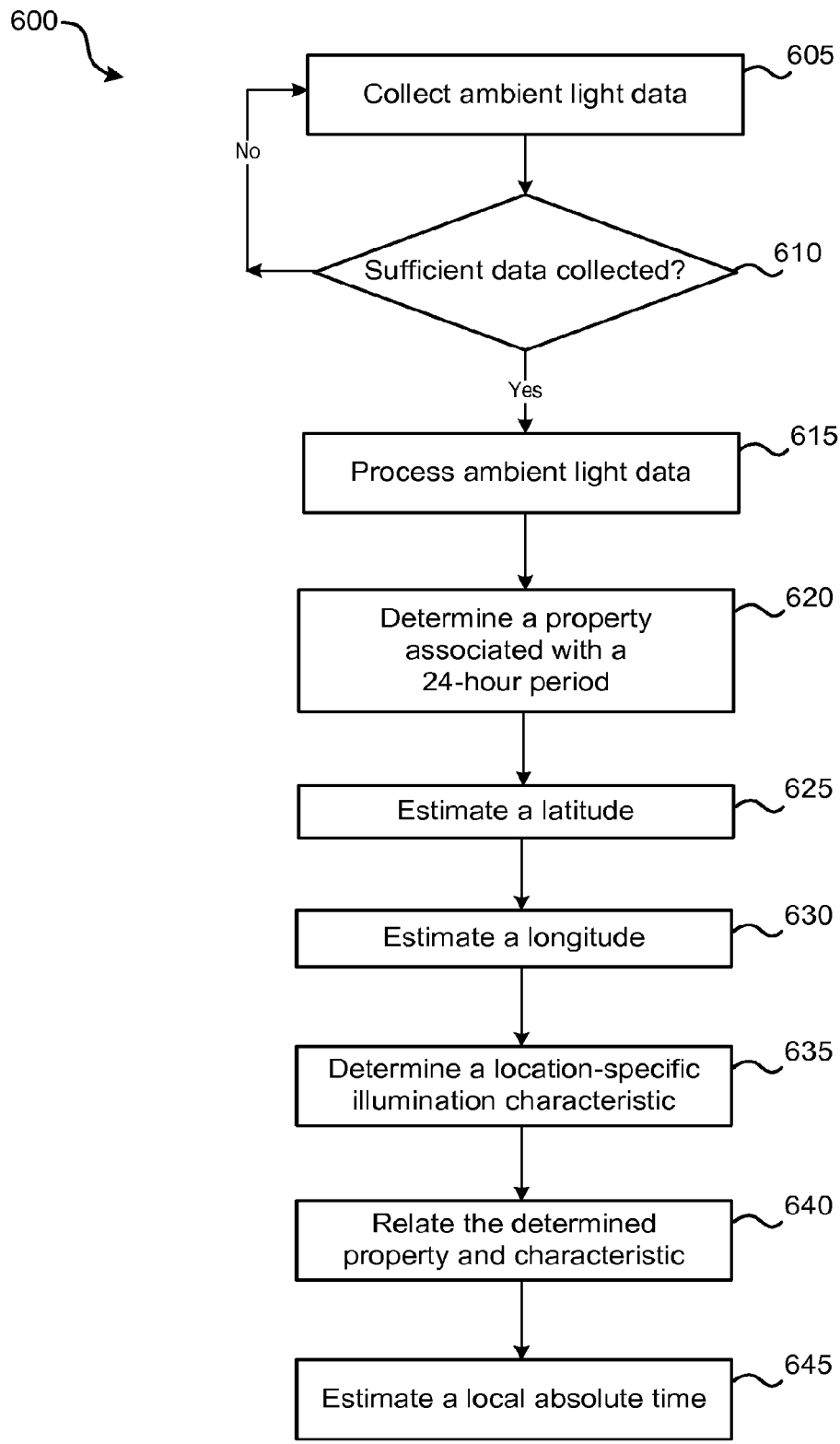
FIG. 6 is flow chart diagram that outlines a process for estimating a time-of-day, according to one embodiment.

With reference to FIG. 6, a flowchart of an embodiment of a process 600 for estimating a time-of-day is shown. The depicted portion of the process begins at block 605 where ambient light data is collected (e.g., using a sensor within a thermostat device that detects light intensities). Other embodiments could use other sensor data that correlates to time-of-day. The data may be collected across a plurality of samples, the samples being separated by sampling intervals. The inter-sampling intervals may be fixed or varied. For example, an inter-sampling interval may be longer after initial samples have been obtained (and, e.g., a first time-of-day is estimated), or an inter-sampling interval may be longer after collections of a plurality of dark samples. In one embodiment, samples are collected at intervals of about five minutes at least until an a first time-of-day is estimated.

Some embodiments could try to filter out manmade light from sunlight. For example, samples could be synchronized to the 50 or 60 Hz power grid such that only data were sampled between power wave peaks. Some embodiments could filter for spectral components of light common to sunlight, but less prevalent in artificial light. Another embodiment could avoid taking samples where the sensed light had a 50 or 60 Hz waveform. Filtering could remove data that doesn't conform to a smooth 24 hour or daytime cycle. For light sensor data that doesn't seem to be synchronized with a 24 hour cycle, other sensor information could be used, for example, proximity sensing, temperature sensing, radio frequency power or data levels, humidity sensing, noise sensing, etc. Some embodiments would filter for any 24 hour cycles in any available sensor data to make a determination on the likely time.

With respect to each ambient light sample, data is collected during a time interval referred to as a sampling duration. Shorter sampling durations reduce resource use associated with a sensor and data storage. However, longer sampling durations may improve a sensor's accuracy, e.g., by allowing a sensor to collect photons even in relatively dark surroundings to thereby allow differentiation between various dark recording times. Sampling durations may be fixed or varied (e.g., such that longer sampling durations are used when it is predicted, based on a current or initial sample, that it is dark). In one embodiment, sampling durations are approximately five seconds. The collected data is stored locally or on a remote storage device.

After one or more samples have been collected, it is determined whether sufficient data has been collected at block 610. The determination is based at least partly on a number of samples collected and/or a total sampling time. The determination may be based on one or more of: an amount of data collected, one or more pre-set collection/sampling thresholds, a quality of data collected, previous attempts to process the data, whether the collection is an initial collection (e.g., during or following a setup) or subsequent (e.g., verification, maintenance or adjustment) collection, availability of user inputs (e.g., a local zip code or approximate time), one or more time-estimation objectives, etc. In one embodiment, data is collected across a plurality of days (e.g., about 1-4 weeks) during an initial collection, and this data is used to estimate a local time. Subsequently, data is collected across a plurality of hours (e.g., about 12-48 hours), and the subsequent data is used to verify or adjust the estimated time. A total sampling time may be longer when less or no external information regarding time is available to a device (e.g., when a device is not aware of a date or time-of-year or receives no user input related to a current time).

If it is determined that an insufficient amount of data has been collected, additional data is collected at block 605. Upon determining (at block 610) that sufficient data has been collected, the collected ambient light data is processed at block 615. Processing may involve excluding part of the collected data. For example, data estimated to have been predominately caused by usage of artificial lights may be excluded. This estimation may be based on relatively high and/or constant light intensities and/or light intensities preceding or following abrupt changes in light intensities. As another example, outliers may be identified (e.g., by comparing data collected across corresponding times within 24-hour time periods) and excluded.

Processing may involve averaging data across 12-hour, 24-hour or 48-hour time periods. Data may be divided into 12-hour, 24-hour or 48-hour time blocks, and the data may then be averaged across the time blocks. Inter-day averaging may reduce noise caused by usage of artificial lights, abnormal cloud cover, etc. However, inter-day averaging may negate inter-day changes in, e.g., sunrise/sunset times, which may make it more difficult to predict a time within a year. In one instance, inter-day averaging is performed at a moderate level to balance these objectives. In one instance, a degree of inter-day averaging depends on whether a property to be estimated is relatively date-independent (e.g., a phase of an illumination cycle) or not (e.g., a time of crossing a noise-threshold corresponding to a sunrise time). Notably, different estimations may be made and/or different properties determined using different types of averaging.

Processing may involve filtering data within a pre- or post-averaged time period (e.g., a 24-hour or 48-hour time period). For example, data collected during a particular sample or time window may be averaged, or all data (e.g., collected across multiple 24-hour or 48-hour time periods) corresponding to a particular sample or time window relative to a start of a time period may be averaged. Filtering may or may not involve using a sliding window (e.g., to filter overlapping bins). Filtering may include a constant window function (such that it amounts to average) or a more variant window function (e.g., a Hamming window). Filter window lengths and shapes may be selected to, e.g., remove high-frequency noise.

In some embodiments, processing involves comparing data to a threshold and/or assessing a slope of the data. For example, a noise-crossing time may be identified by comparing one or more temporal signals comprising the data to a noise threshold (such that crossing the threshold suggests a sunrise or sunset time, depending on the sign of a slope of the data at that time). The comparison may involve comparing each, e.g., 24-hour time period to the threshold (and subsequently computing a final threshold-crossing time based on, e.g., mean, median or mode calculations, weightings, and/or outlier elimination). The comparison may involve comparing an average of data within two, more or all of, e.g., 24-hour time periods to the threshold.

Processing may involve transforming temporal data to the frequency domain (e.g., by using a Fourier transform). For example, outliers may be removed from collected data, the outlier-removed data may be condensed into a 48-hour time period (e.g., by averaging 48-hour blocks with overlaps of 0 or 24 hours between blocks), and the condensed data may be filtered to reduce high-frequency noise that may be introduced by artificial lighting. The temporal filtered data may then be transformed into the frequency domain (e.g., using a fast Fourier transform). The power and phase of frequency-specific sinusoidal components of the signal may be identified.

At block 620, one or more properties associated with a 24-hour period are determined. A 24-hour period corresponds to a 11.57 µHz frequency. Thus, the property may include a phase and/or power associated with a frequency equal to or approximately equal to 11.57 µHz. The property may include a time (e.g., relative to a start of a 24-hour or 48-hour time period) of threshold-crossing, a slope at threshold-crossing, a device time at maximum, etc.

The one or more properties determined at block 620 are used to estimate a latitude or latitude band at block 625. For example, a look-up table, model or equation could relate sunrise times, sunset times, or day lengths to particular latitudes or latitude bands. A confidence metric associated with the latitude estimation may further be determined.

Knowledge of a date or season may allow for more accurate latitude estimations and/or may assist in predicting climate-control objectives. In instances in which a date or season is unknown, a longer signal may be analyzed in an attempt to estimate the date or season. Values for a property may be determined for each of a plurality of days, outliers may be excluded, and an inter-day trend in the property may be established. For example, a lookup table containing, for each latitude, a rate of change of sunrise and/or sunset times versus the day of the year can be used to allow an estimation of the latitude. Additionally or alternatively, a property associated with a longer period (e.g., a yearly period) is determined. For example, an extended signal may be transformed into the frequency domain, and properties (e.g., power and/or phase) associated with a 31.7 nHz (corresponding to a period of one year) may be determined. In this embodiment, it may be advantageous to determine a single value of the property, as the 31.7 nHz signal will reflect inter-day illumination variations.

A longitude or longitude band is estimated at block 630. In one instance, the longitude is estimated based on the one or more properties determined at block 620. For example, sunrise and sunset times are slightly dependent on longitude, due to the Earth's elliptical trajectory around the sun and the Earth's tilt. In one instance, the longitude is estimated based on other factors. For example, given an estimated latitude or latitude band, a look-up table or model could identify a distribution of a population across longitude bands (e.g., corresponding to time zones, states, cities, etc.). A longitude band associated with a highest population or highest population density may be selected as an estimated longitude. In one instance, a default or bias longitude or longitude band influences the estimated longitude. For example, a default or bias may be selected to reduce the probability of extreme errors, such that the default or bias favors a longitude selection near a center of a country or continent. A device may be pre-programmed with a country or continent selection (based on known device distribution locations), to further restrict the longitudes for consideration in the estimation. Any of the above estimation techniques may be used alone or in combination to estimate the longitude or longitude band.

Given the estimated longitude and latitude, one or more location-specific illumination characteristics (e.g., sunrise/sunset times, time of highest light intensity, etc.) are determined at block 635. The characteristic may be for a particular date or time of the year (e.g., if a device tracks dates), or a plurality of characteristics (e.g., across dates or time periods) may be determined. The characteristic may have a qualitative similarity or sameness to one or more of the properties determined at block 620. For example, a noise-threshold crossing may be determined at block 620 in an attempt to estimate a sunrise and/or sunset time, and an absolute sunrise or sunset time in the estimated location may be determined at block 635. As another example, a property determined at block 620 may include a phase of a 11.57 µHz component of the collected data, and a characteristic determined at block 635 may include a phase of an absolute-time 11.57 µHz signal. Location-specific illumination characteristics may be determined by looking up the characteristics in a table, estimating them based on a model or equation, etc. The characteristics may be determined based on historical data and/or theoretical results.

The one or more characteristics determined at block 635 and one or more properties determined at block 620 are related to each other at block 640. For example, the property determined at block 620 may include a phase. A difference between this phase and an absolute-time-locked phase characteristic determined at 635 may be identified to determine how a time-zero of the processed light data relates to an absolute time (to estimate a time-of-day). As another example, the property determined at block 620 may include a time between two crossings of a noise threshold. The time may be compared to an a plurality of day lengths associated with the location, each corresponding to a date, time period or season. One or more signals used for the property determination may then be assigned to a matching date, time period or season.

Upon determining this relationship, a local absolute time is estimated at block 645. For example, a device-internal clock may be set, or a relationship between absolute time and a default device time may be established, and the absolute local time may then be estimated based on the clock or relationship. Process 600 may be repeated periodically to verify or adjust the device-internal clock or the relationship between absolute time and the default device time.

Process 600, in some embodiments, results in an estimation of time with a granularity of minutes or seconds (e.g., by comparing a phase of a collected-data signal to a phase expected based on the estimated location). This may allow a device to estimate a precise time without requiring user input or an internal clock that accurately identifies the current minute or hour (which may be disturbed as a result of power breaks).

In some embodiments, the time estimation merely comprises an estimation of a local time zone. Using this information, it may be estimated what hour it is at a device location. A clock in the device may identify a current minute (and possibly second) time. That is, e.g., regardless as to whether a device is located in New York City or San Diego, the minute- and second-components of the time are unchanged and could be identified by an internal clock. Thus, a time may be estimated down to minute- or second-precision, even though illumination data is only used to estimate the less precise hour component of the time.

Using process 600, a local time may be estimated without utilization of any user input. However, in some instances, user input is received. For example, a user may input a time, and analysis of illumination data may verify that the inputted time is reasonable. As another example, a user inputs his location. A process such as process 600 may use such inputs to restrict potential locations (e.g., estimated longitude and latitude coordinates).

Although shown as a unitary process 600, other embodiments could break up the data collection blocks from the processing blocks. Data gathering would happen over time to improve the data set and periodically the processing blocks would determine if adjustments to time-of-day should be made.

Figure 7:
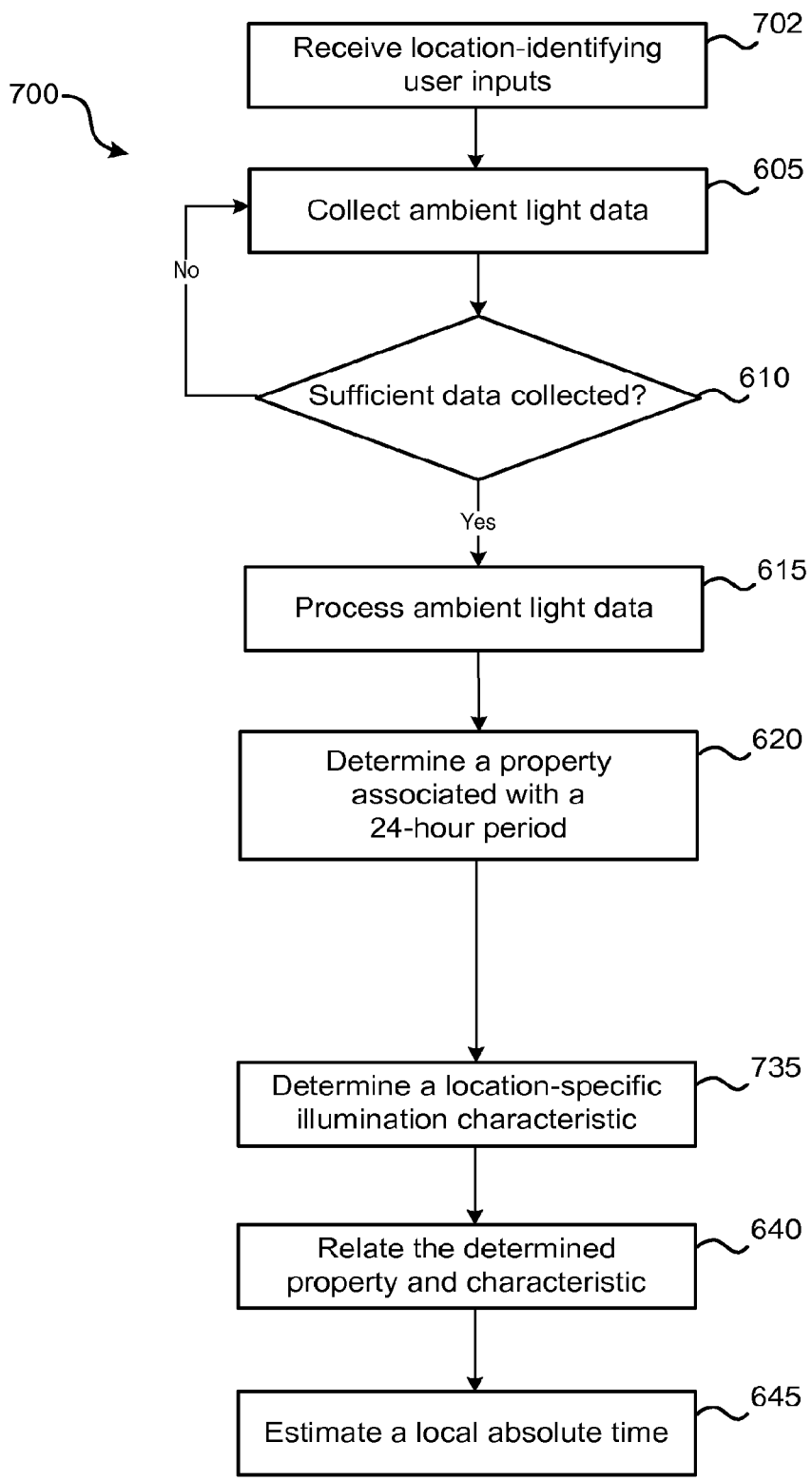
FIG. 7 is flow chart diagram that outlines a process for estimating a time-of-day, according to another embodiment.

Referring next to FIG. 7, a flowchart of an embodiment of a process 700 for estimating a time-of-day based at least in part on a user-input location is shown. The depicted portion of the process begins at block 702, at which location-identifying user inputs are received. The location-identifying user inputs may include, e.g., a zip code, a time zone, a city, a state, a country, an area code, etc. This information may be entered by the user or gathered from where the VSCU was originally shipped. Some embodiments may get some time information from the network also, but often that doesn't reflect time zone and can be totally inaccurate.

Corresponding blocks in FIG. 7 and FIG. 6 largely parallel each other. However, the processes are particularly distinct in that process 700 shown in FIG. 7 does not include location estimations (as are included at blocks 625-630 in process 600). Instead, location-specific illumination characteristics are determined at block 735 based on the location-identifying user input gathered in block 702. Thus, for example, the process 700 may include identifying a local time by comparing a phase of collected illumination data to an absolute-time phase in a location-specific look-up table (LUT). While process 700 depends on user input, the process may be completed faster than process 600, require less storage and processing resources, and still not require a clock with minute readings that remain accurate throughout the use of a device.

In some embodiments, a local time is calculated by adjusting an internal clock based on location-identifying user input. For example, a local clock may always indicate a time in the Eastern Standard Time (EST) time zone, and a zip code may be used to add or subtract hours as needed to adjust for any differences between a local time zone and the EST time zone. However, illumination data may still be collected and compared to location-specific illumination characteristics to provide a confidence in this technique. For example, if a property associated with collected data differed from a location-specific illumination characteristic by approximately an hour or more, a device may prompt a user to re-enter location-identifying information or may estimate a new location based on the data.

Figure 8:
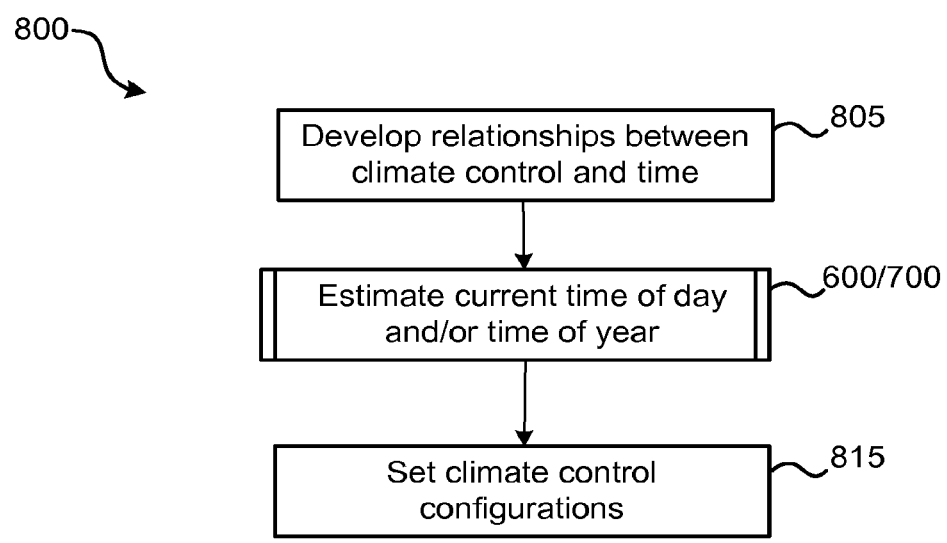
FIG. 8 is flow chart diagram that outlines a process for setting climate control configurations, according to one embodiment.

Referring next to FIG. 8, a flowchart of an embodiment of a process 800 for setting climate control configurations is shown. The depicted portion of the process 800 begins at block 805 at which relationships between climate control and time (e.g., of a day, of a week, of a year, etc.) are developed. These relationships may be pre-programmed, set by a user and/or learned. For example, one relationship may indicate that a temperature should depend on motion detection during a first time period during the day (e.g., from 8 AM-8 PM) and remain relatively constant during a second time period (e.g., from 8 PM-8 AM). One relationship may indicate that a temperature should be reduced during standard work hours during weekdays. One relationship may indicate that a default temperature should be set lower during a winter season as compared to a summer season.

A current time-of-day is estimated at block 600 or 700. The time-of-day and/or time-of-year (e.g., calendar date, month, season, etc.) may be estimated based on collected ambient light data, e.g., using a process such as process 600 shown in FIG. 6 or process 700 shown in FIG. 7. In some instances, the time-of-day and/or year is estimated using: a network connection to receive the time from a remote server, a receiver (e.g., receiving satellite or cell-phone-tower signals), programmed information, or user-defined information.

Based on the estimated time and developed relationships, climate control configurations are set at block 815. For example, if a relationship exists that a house's temperature should be colder between 9 AM-5 PM on weekdays compared to other times, and if it is estimated to be 1 PM on a Tuesday, the climate control configurations may be set to produce the colder temperatures.

Figure 9:
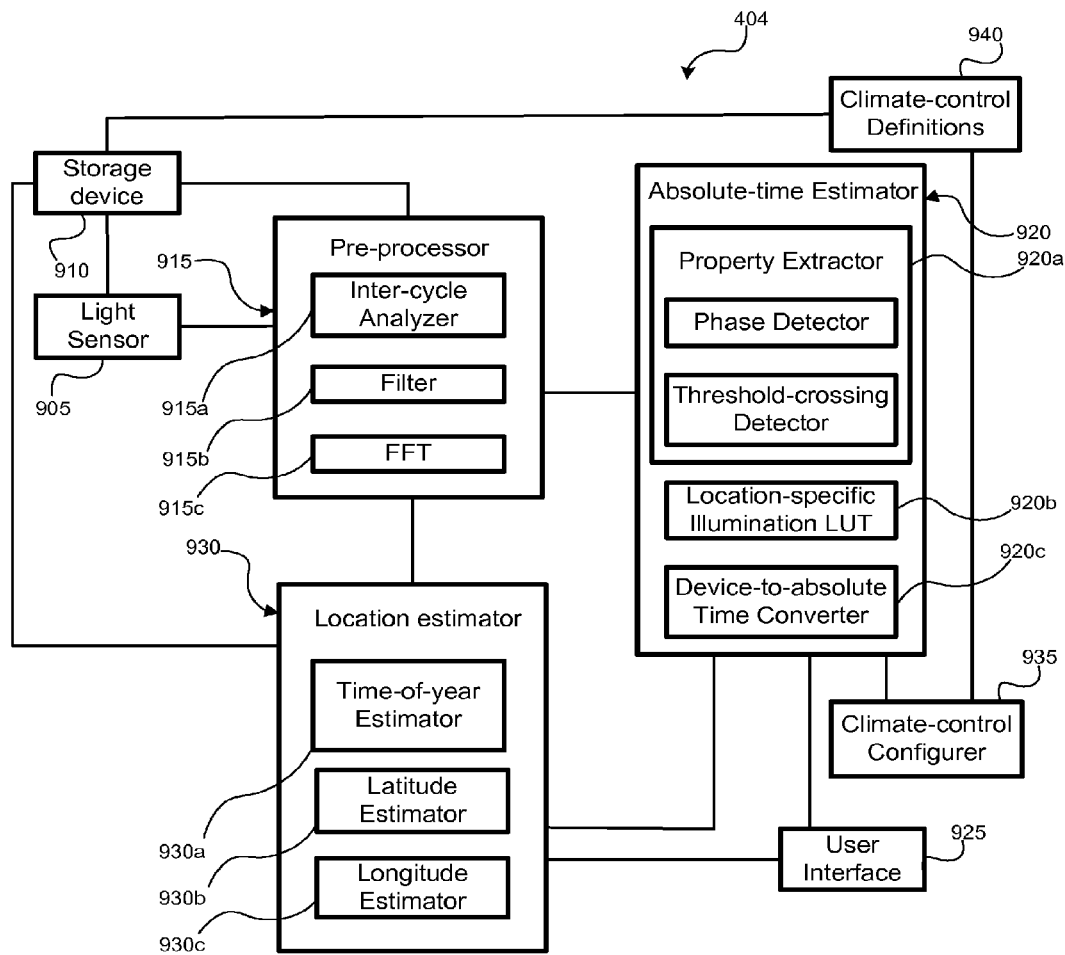
FIG. 9 illustrates an overview of the functional software, firmware, and/or programming architecture of the schedule, learning and management (SLM) function, according to one embodiment.

Referring first to FIG. 9, a block diagram overview of the functional software, firmware, and/or programming architecture of an embodiment of the SLM function 404 is shown. A light sensor 905 light sensor senses light (e.g., light intensities) throughout a sampling duration (e.g., several days, weeks, months, continuously). The sensed data is associated with a time stamp (which may be based on a semi-arbitrary device start time, not a true time), and the sensed data may be stored in a storage device 910.

The sensed data may be processed by a pre-processor 915. An inter-cycle analyzer 915a may, e.g., align data collected across multiple, corresponding time periods (e.g., 24-hour or 48-hour time periods), detect and remove outliers, detect and remove saturated data, and combine (e.g., average) data across the time periods. A filter 915b may filter intra- and/or inter-cycle data. For example, data collected during a single sample collection or time period may be averaged, smoothed or filtered using any of a variety of filter lengths or windows. Such filtering may reduce noise and improve time estimations.

In some instances, Fast Fourier Transform (FFT) 915c may transform temporal data into the frequency domain. For example, a power spectra and a frequency-dependent phase signal may be obtained. Though FIG. 9 shows an FFT transform, other transforms may be included additionally or alternatively.

The pre-processed data may be analyzed by a absolute-time estimator 920. Absolute-time estimator may include a property extractor 920a configured to reduce a dimensionality of the pre-processed illumination data and/or to extract a property of interest. The property of interest may be associated with a 24-hour cycle. For example, property extractor 920a may include a phase detector configured to detect a phase of an 11.57 µHz component of the data and/or a threshold-crossing detector configured to detect a relative time of crossing a threshold (e.g., a noise threshold) and a direction of the cross (to estimate sunrise and/or sunset times).

A location-specific illumination look-up table (LUT) 920b may associate one or more absolute-time properties with one or more locations. For example, the LUT 920b may identify a sunrise or sunset absolute time or an illumination phase with given a particular location. In some instances, a model or equation is used instead of or in addition to the LUT 920b.

Using the absolute-time properties identified using LUT 920b and the device-time properties extracted by property extractor 920a, a device-to-absolute time converter 920c may identify a conversion between a default device time and an absolute local time. The converter may, e.g., identify an equation, reset a device clock, create or modify a model, etc.

The location used to determine location-specific absolute-time properties may be one based on input received via a user interface 925. For example, a user may have input their zip code. The location be may determined based on storage information (e.g., if a device was pre-programmed with location information based on a known distribution or shipping area). The shipping area could have been to a retailer and not the end user, but the retailer address could be used as an estimate of location presuming that the end user purchased the VSCU 100 nearby.

In some instances (e.g., if a user does not or cannot input their location), a location estimator 930 estimates a location based at least partly on data collected by the light sensor 905. Location estimator 930 receives a pre-processed signal from pre-processor 915. A time-of-year estimator 930 may estimate, e.g., a date, month, season, etc. The estimation may be made based on inter-day illumination variation (e.g., trends in times of threshold crossings, trends in maximum illumination intensities, phases of a 3.17 nHz signal component, etc.). In some instances, a time-of-year is known (e.g., based on stored information or user input received via the user interface 925, or programming at manufacture).

A latitude estimator 930b may estimate a device latitude or latitude band, as described in greater detail with respect to block 625 in FIG. 6. This estimation may or may not depend on a time-of-year estimation. For example, if a calendar date is known, a latitude estimator 930b may be able to use an LUT, model or equation to estimate the latitude based on a sunrise and sunset times and the date.

A longitude estimator 930c may estimate a device longitude or longitude band, as described in greater detail with respect to block 630 in FIG. 6. The longitude may be estimated based on collected illumination data and/or based on a stored population-density LUT (e.g., segregated by latitude bands).

As shown, the location estimator 930 estimates geographical coordinates (i.e., latitude and longitude coordinates). In other embodiments, other location estimations may be alternatively or additionally made. For example, a location estimation may include an estimation of a local address, city, state, time zone, country, etc.

Using the absolute time estimated by the absolute-time estimator 920, climate-control configurer 935 can set a climate-control configuration, as described in greater detail with respect to block 815 of FIG. 8. In one embodiment, the climate-control configurer 935 receives the estimated time, looks up applicable climate-control definitions (e.g., set by the manufacturer and/or user or learned), and applies the definition.

In one embodiment, the light sensor 905 collects illumination data, and the pre-processor 915 pre-processes the data. The location estimator 930 receives the pre-processed data, estimates a time-of-year based on inter-day trends, estimates a latitude based on an intra-day property (e.g. phase), and estimates a longitude based on latitude-specific population densities. The estimated location is provided to the absolute-time estimator 920. The absolute-time estimator 920 extracts a phase from the pre-processed data, the phase corresponding to an 11.57 µHz component in the data. The absolute-time estimator 920 looks up a phase corresponding to an 11.57 mHz in the location-specific illumination LUT 920b, the LUT 920b being associated with absolute times for a given location. Using the absolute-time phase and the data-derived phase, a conversion is identified, and an absolute local time is estimated. One or more of the time-dependent climate-control definitions 940 may then be implemented by the climate-control configurer 935.

While examples and implementations have been described, they should not serve to limit any aspect of the present invention. Accordingly, various modifications may be made without departing from the spirit and scope of the invention. Indeed, the VSCU could be used to control anything that uses some understanding of solar cycles or time-of-day. Although the above description relates to determining time-of-day and other things automatically, other embodiments may not result in a determination of the time-of-day to simply rely on a solar cycle or occupant cycle. Controlling the HVAC generally correlates to solar cycle and/or occupant cycle and all the control of the HVAC could be in relation to the cycle without necessarily knowing time-of-day or time-of-year.

Numerous specific details are included herein to provide a thorough understanding of the various implementations of the present invention. Those of ordinary skill in the art will realize that these various implementations of the present invention are illustrative only and are not intended to be limiting in any way. Other implementations of the present invention will readily suggest themselves to such skilled persons having the benefit of this disclosure.

In addition, for clarity purposes, not all of the routine features of the implementations described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

What is claimed is:

1. An electronic device, comprising:
a power source;
a housing;
a clock function for tracking a time-of-day;
a sensor that performs measurements of an environmental condition that varies with the time-of-day;
a processor configured to:
receive the measurements from the sensor,
perform a transform to convert the received measurements to the frequency domain;
identify a component of the received measurements in the frequency domain having a period of approximately 24 hours;
determine when the component having the period of approximately 24 hours has crossed a predefined threshold;
modify programming of the clock function to reverse an AM/PM setting based on determining when the component having the period of approximately 24 hours has crossed the predefined threshold; and
operate the electronic device using the clock function according to the modified programming of the clock function.

2. The electronic device of claim 1, wherein the electronic device is a thermostat and the thermostat further comprises:
a plurality of heating, ventilation, and air conditioning (HVAC) wire connectors to communicatively couple the processor with an HVAC system, the HVAC system being controlled by the processor at least partially based on the modified programming of the clock function.

3. The electronic device of claim 1, wherein the processor is further configured to: prompt a user for the programming of the clock function during an initial setup of the electronic device, wherein the user is prompted to input an indication of AM or PM.

4. The electronic device of claim 1, further comprising an electronic display configured to display information to a user, wherein the processor is further configured to cause the electronic device to display the modified programming of the clock function for the user to confirm the modified programming.

5. The electronic device of claim 1, wherein the processor is further configured to estimate the time-of-day using the determination of when the component having the period of approximately 24 hours crossed the predefined threshold.

6. The electronic device of claim 1, wherein the sensor comprises a light sensor comprising a filter to accentuate wavelengths of sunlight over man-made light.

7. The electronic device of claim 1, wherein the sensor is selected from the group consisting of:
a light transducer,
a temperature transducer,
an infra-red transducer,
a video capture array,
a sound transducer, and
an radio frequency transducer.

8. A thermostat, comprising:
a housing;
a clock function for tracking a time-of-day;
a sensor that performs measurements of an environmental condition that varies with the time-of-day;
a plurality of heating, ventilation, and air conditioning (HVAC) wire connectors; and
a processor configured to:
receive the measurements of the environmental condition from the sensor,
perform a transform to convert the received measurements to the frequency domain;
identify a component of the received measurements in the frequency domain having a period of approximately 24 hours;
determine when the component having the period of approximately 24 hours has crossed a predefined threshold;
program the clock function based on determining when the component having the period of approximately 24 hours has crossed the predefined threshold; and
control an HVAC system, via the plurality of HVAC wire connectors, at least partially based on the programming of the clock function.

9. The thermostat of claim 8, wherein the processor is further configured to develop one or more relationships between the programmed clock function and climate control.

10. The thermostat of claim 9, wherein the processor is further configured to control the HVAC system via the plurality of HVAC wire connectors based on the developed one or more relationships.

11. The thermostat of claim 8, further comprising an electronic display configured to display information wherein the processor is further configured to prompt a user to provide a zip code during a setup process of the thermostat.

12. The thermostat of claim 11, wherein the processor is configured to program the clock function based on determining when the component having the period of approximately 24 hours has crossed the predefined threshold and the zip code provided during the setup process.

13. The thermostat of claim 11, wherein the sensor comprises a light sensor filtered to accentuate wavelengths of sunlight over man-made light.

14. The thermostat of claim 11, further comprising an electronic display configured to display information to the user, wherein the processor is further configured to cause the thermostat to display a time based on the programmed clock function for the user to confirm the time.

15. A method for programming a clock function of an electronic device, the method comprising:
- receiving sensor measurements from a sensor;
- performing a transform to convert the received sensor measurements to the frequency domain;
- identifying a component of the received sensor measurements in the frequency domain having a period of approximately 24 hours;
- determining when the component having the period of approximately 24 hours has crossed a predefined threshold;
- modifying programming of the clock function to reverse an AM/PM setting based on determining when the component having the period of approximately 24 hours has crossed the predefined threshold; and
- operating the electronic device using the clock function according to the modified programming of the clock function.

16. The method for programming the clock function of the electronic device of claim 15, further comprising: controlling a heating, ventilation, and air conditioning (HVAC) system at least partially based on the modified programming of the clock function.

17. The method for programming the clock function of the electronic device of claim 15, further comprising prompting a user to program the clock function during an initial setup of the electronic device.

18. The method for programming the clock function of the electronic device of claim 15, further comprising: displaying an interface via an electronic display of the electronic device, the interface requesting a user to confirm the modified programming of the clock function.

19. The method for programming the clock function of the electronic device of claim 15, further comprising: estimating a time-of-day using the determination of when the component having the period of approximately 24 hours crossed the predefined threshold.

20. The method for programming the clock function of the electronic device of claim 15, further comprising: filtering light that is to be received by the sensor to accentuate wavelengths of natural light over artificial light, wherein the sensor is a light sensor.

* * * * *